United States Patent [19]

Iwama et al.

[11] Patent Number: 5,586,158
[45] Date of Patent: Dec. 17, 1996

[54] APPARATUS FOR AUTOMATICALLY REPLACING NUCLEAR FUEL ASSEMBLIES

[75] Inventors: Kunihiko Iwama; Tomiharu Yoshida, both of Hitachinaka, Japan

[73] Assignee: Hitachi, Ltd., Tokyo, Japan

[21] Appl. No.: 495,905

[22] Filed: Jun. 28, 1995

[30]     Foreign Application Priority Data

Jun. 30, 1994   [JP]   Japan .................................. 6-149059

[51] Int. Cl.⁶ ............................................... G21C 19/10
[52] U.S. Cl. ............................................ 376/268; 376/248
[58] Field of Search ................................. 376/248, 258, 376/264, 268, 271, 452; 294/906; 348/83

[56]                   References Cited

U.S. PATENT DOCUMENTS

| | | | |
|---|---|---|---|
| 4,929,413 | 5/1990 | Kaufmann et al. | 376/268 |
| 5,089,213 | 2/1992 | Omote et al. | 376/248 |
| 5,490,185 | 2/1996 | Dent et al. | 376/268 |

FOREIGN PATENT DOCUMENTS

| | | |
|---|---|---|
| 52-135992 | 11/1977 | Japan . |
| 63-142296 | 6/1988 | Japan . |

Primary Examiner—Daniel D. Wasil
Attorney, Agent, or Firm—Antonelli, Terry, Stout & Kraus

[57]                   ABSTRACT

An automatic nuclear fuel assembly replacing apparatus has a bridge and a trolley movable in X and Y axis directions, respectively. Mounted on the trolley is a nuclear fuel grapple movable in a Z axis direction and rotatable about the Z axis. A television camera mounting unit is also mounted on the trolley and movable in the Z axis direction. A control system of the apparatus moves the bridge and the trolley so that the center of an underwater television camera supported by the camera mounting unit is centered to a desired target position. Then, calculations are performed on the deviations of the position of the thus positioned camera and a target fuel assembly in the X and Y axis directions and about the Z axis, respectively. The thus calculated results are corrected by a deviation between the fuel grapple and the camera, whereby the position of the fuel grapple is finally controlled to be in alignment with the position of the target fuel assembly in the X and Y axis directions and about the Z axis.

4 Claims, 8 Drawing Sheets

APPARATUS FOR AUTOMATICALLY REPLACING NUCLEAR FUEL ASSEMBLIES

BACKGROUND OF THE INVENTION

1. Field of the Invention

The present invention relates to an automatic fuel assembly-replacing apparatus which is installed in facilities, such as a nuclear reactor, a fuel storage pool or the like, so as to transfer nuclear fuel assemblies. More particularly, the invention relates to a nuclear fuel assembly-replacing apparatus suited for automatically positioning and transferring nuclear fuel assemblies in a facility in which the storage positions of the fuel assemblies are variable within a predetermined range.

2. Description of the Prior Art

A conventional fuel assembly-replacing apparatus is disclosed in, for example, Japanese Unexamined Patent Publication No. 52-135992. In the conventional fuel assembly-replacing apparatus for transferring fuel assemblies in a reactor or a fuel storage pool, the position of a fuel assembly is set at an X–Y coordinate on the X–Y axis plane. For positioning a fuel grapple to the set position, synchronous transmitters are rotated by intermesh between rack gears attached to the lateral surfaces of rails and pinions mounted on a bridge and a trolley. Based on output signals from the transmitters, the current positions (X and Y coordinates) of the fuel grapple are detected, and automatic control is performed on the bridge motor and the trolley motor so that the deviation between the current position of the fuel grapple and the targeted position of the fuel assembly becomes zero. This conventional technique is applicable only to the case where the targeted position of the fuel assembly is fixed and is unable to perform an automatic positioning in the case where the targeted position is variable within a specified range.

FIG. 6A is a cross sectional view illustrating the core of a boiling water reactor. Reference numeral 13 designates nuclear fuel assemblies; 29 denotes control rods; and 28 indicates a LPRM (Local Power Range Monitors). As shown in FIG. 6B, four fuel assemblies 13 surrounding one control rod 29 constitute a cell. Respective handles 13A of the four fuel assemblies 13 face the control rod 29.

While the reactor is operated, the reactivity of the core is gradually decreased. It is thus required that a used fuel assemblies be replaced by new ones at regular intervals. The operation period between fuel replacement times is referred to as a cycle. There are approximately 800 fuel assemblies in the core of a 110 million KW power reactor, and it is necessary that one-fourth to one-third of the 800 fuel assemblies be replaced at every periodical inspection.

FIG. 7 illustrates the loading pattern of the nuclear fuel assemblies, that is, the arrangement of the fuel assemblies, in the core of the boiling water reactor. Referring to FIG. 7, the figures (4–6) given to the respective fuel assemblies 13 denote the number of cycles while the assemblies remain in the reactor core. The assemblies with the same figure should be replaced by new ones at the same time. In FIG. 7, the fuel assemblies 13 with the cycle number of 4, 5 and 6 are designated by FIGS. 4, 5 and 6, respectively. The fuel assemblies 13 to be replaced at the same time, for example, the hatched fuel assemblies 13 with the cycle number of 6 are always obliquely aligned in a row and disposed adjacent to each other.

FIG. 8 is a perspective view illustrative of one example of the conventional nuclear fuel assembly-replacing apparatuses. Rails 1 are installed on the top floor of a nuclear reactor building. Mounted on the rails 1 are a bridge 2 on which a trolley 3 is mounted. A fuel grapple 4 for gripping fuel assemblies is mounted on the trolley 3. A bridge motor 8, a trolley motor 9 and a fuel hoist motor 10 are provided to move the fuel grapple 4 to a targeted position. These motors cause the fuel grapple 4 to move to the targeted position and also to be positioned thereto according to a signal output from an automatic motor controller 11 through a control cable 12. With the conventional technique performed by the above-described conventional apparatus, the fuel grapple 4 is positioned to a target position, that is, to stationary coordinates such as the reactor core or the fuel storage rack. Therefore, it is only essential that the nuclear fuel assembly-replacing apparatus detects the position of itself by the intermesh between the above-mentioned racks and pinions (not shown), thereby enabling the fuel grapple 4 to be positioned to the stationary target position.

However, the performing an automatic positioning of the fuel grapple 4 relative to carrying means which does not possess repeatability of its stop position, such as an underwater fuel assembly carriage, the above-described conventional technique is not operable to locate the fuel grapple 4 to a target position. This problem arises from the fact that, even though a reference stop position of the fuel assembly carriage is set to a target position, the carriage may actually be stopped at a position which deviates from the reference position, which makes it impossible to insert or remove a fuel assembly.

SUMMARY OF THE INVENTION

Accordingly, the main object of the present invention is to provide an automatic nuclear fuel assembly-replacing apparatus which is able to perform an automatic positioning of a fuel grapple at X–Y coordinates under circumstances where the storage condition of the nuclear fuel assembly is variable within a certain range.

Another object of the present invention is to provide an automatic nuclear fuel assembly-replacing apparatus which can avoid the problem that a fuel assembly gripped by a fuel grapple cannot be properly inserted into a reactor core or a fuel storage rack due to a deviation of the lower portion of the assembly, which might bring the automatic operation of a nuclear power station to a halt.

Still another object of the present invention is to provide an automatic nuclear fuel assembly-replacing apparatus in which, when a fuel grapple without any fuel assembly gripped thereby is lowered, a gripper of the fuel grapple is correctly positioned and able to correctly grip a targeted nuclear fuel assembly.

A further object of the present invention is to provide an automatic nuclear fuel assembly-replacing apparatus in which the gripper is actuated to grip a targeted nuclear fuel assembly only when the ID No. of the assembly is identified as being correctly the desired one.

A further object of the present invention is to provide an automatic nuclear fuel assembly-replacing apparatus in which the relationship of the ID number of nuclear fuel assemblies to the storage positions of such assemblies is recorded, thereby eliminating the operation of checking the ID numbers and the actual fuel assemblies stored in the rack, which operation should conventionally be performed at regular intervals.

In order to achieve the above objects, according to a first aspect of the present invention, there is provided an automatic nuclear fuel assembly-replacing apparatus for transferring a nuclear fuel assemblies in a facility, such as a reactor furnace, a nuclear fuel storage pool or the like, said apparatus comprising:

rails fixed to said facility and extending in an x axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said Z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said X and Y axes and about said Z axis, respectively, said controller further including means for controlling said first, second and fourth drive means upon receipt of said signal indicative of the calculated deviations in the directions of said X and Y axes and about said Z axis, respectively, so as to move said fuel grapple by an amount equal to said deviations adjusted by an offset between said television camera and said fuel grapple, thereby bringing the position of said fuel grapple into alignment with that of said target fuel assembly.

According to a second aspect of the present invention, there is provided an automatic nuclear fuel assembly-replacing apparatus for transferring a nuclear fuel assemblies in a facility, such as a reactor furnace, a nuclear fuel storage pool or the like, said apparatus comprising:

rails fixed to said facility and extending in an X axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said Z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said X and Y axes and about said Z axis, respectively, said controller further including means for controlling said first, second and fourth drive means upon receipt of said signal indicative of the calculated deviations in the directions of said X and Y axes and about said z axis, respectively, so as to move said fuel grapple by an amount equal to said deviations adjusted by an offset between said television camera and said fuel grapple, thereby bringing the position of said fuel grapple into alignment with that of said target fuel assembly, said image processor further including:

determining means for determining whether a gripper of said fuel grapple grips a nuclear fuel assembly or not; and detection means for detecting that, when it is determined that said gripper grips the fuel assembly, an amount of deviation of the bottom portion of the fuel assembly is equal to or less than a predetermined value, said controller further including means for controlling said third drive means, upon receipt of a signal from said detection means of said image processor, to lower said gripper and to allow said gripper to release said fuel assembly.

According to a third aspect of the present invention, there is provided an automatic nuclear fuel assembly-replacing apparatus for transferring a nuclear fuel assemblies in a facility, such as a reactor furnace, a nuclear fuel storage pool or the like, said apparatus comprising:

rails fixed to said facility and extending in an X axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said Z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said X and Y axes and about said Z axis, respectively, said controller further including means for controlling said first, second and fourth drive means upon receipt of said signal indicative of the calculated deviations in the directions of said X and Y axes and about said Z axis, respectively, so as to move said fuel grapple by an amount equal to said deviations adjusted by an offset between said television camera and said fuel grapple, thereby bringing the position of said fuel grapple into alignment with that of said target fuel assembly, said image processor further including:
  determining means for determining whether a gripper of said fuel grapple grips a nuclear fuel assembly or not;
  detection means for detecting that, when it is determined that said gripper does not grip any fuel assembly, an amount of deviation of the bottom portion of said gripper is equal to or less than a predetermined value so as to allow said controller to control said third drive means so that said fuel grapple is lowered;
  means for reading an ID number marked on the targeted fuel assembly and determining that the read ID number corresponds to a desired one, thereby permitting said controller to control said third drive so that said fuel grapple is lowered, and also allowing said gripper to perform a gripping operation; and
  means for recording and storing a relationship between the thus read ID number of the fuel assembly and the position at which the assembly is stored.

According to a fourth aspect of the present invention, there is provided an automatic nuclear fuel assembly-replacing apparatus for transferring a nuclear fuel assemblies in a facility, such as a reactor furnace, a nuclear fuel storage pool or the like, said apparatus comprising:

rails fixed to said facility and extending in an X axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said X and Y axes and about said Z axis, respectively, said controller further including means for controlling said first, second and fourth drive means upon receipt of said signal indicative of the calculated deviations in the directions of said X and Y axes and about said Z axis, respectively, so as to move said fuel grapple by an amount equal to said deviations adjusted by an offset between said television camera and said fuel grapple, thereby bringing the position of said fuel grapple into alignment with that of said target fuel assembly, said image processor further including:
  determining means for determining whether a gripper of said fuel grapple grips a nuclear fuel assembly; and
  detection means for detecting that, when it is determined that said gripper grips said fuel assembly an amount of deviation of the bottom portion of the fuel assembly is equal to or less than a predetermined value, said controller further including means for controlling said third drive means, upon receipt of a signal from said detection means of said image processor, to lower said gripper and cause said gripper to release said fuel assembly, said image processor further including:
  detection means for detecting that, when it is determined that said gripper does not grip any fuel assembly, an amount of deviation of the bottom portion of said gripper is equal to or less than a predetermined value so as to allow said controller to control said third drive means so that said fuel grapple is lowered;

means for reading an ID number marked on the target fuel assembly and determining that the read ID number corresponds to a desired one, thereby permitting said controller to control said third drive means so that said fuel grapple is lowered, and also allowing said gripper to perform a gripping operation; and means for recording and storing a relationship between the thus read ID number of the fuel assembly and the position at which the assembly is stored.

DESCRIPTION OF PREFERRED EMBODIMENT

Figure 1:
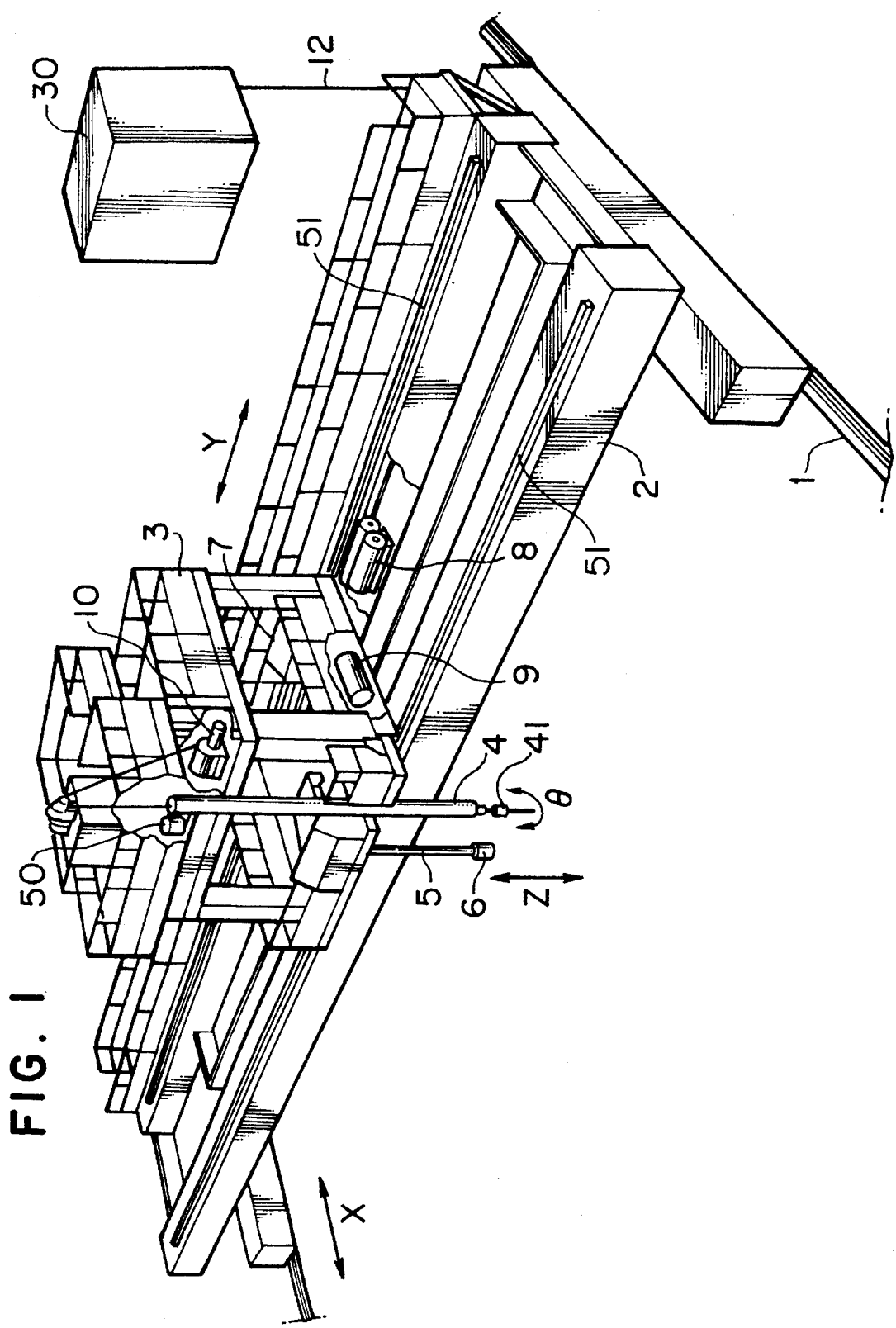
FIG. 1 is a perspective view illustrative of the structure of an embodiment of an automatic nuclear fuel assembly-replacing apparatus according to the present invention.
Figure 2:
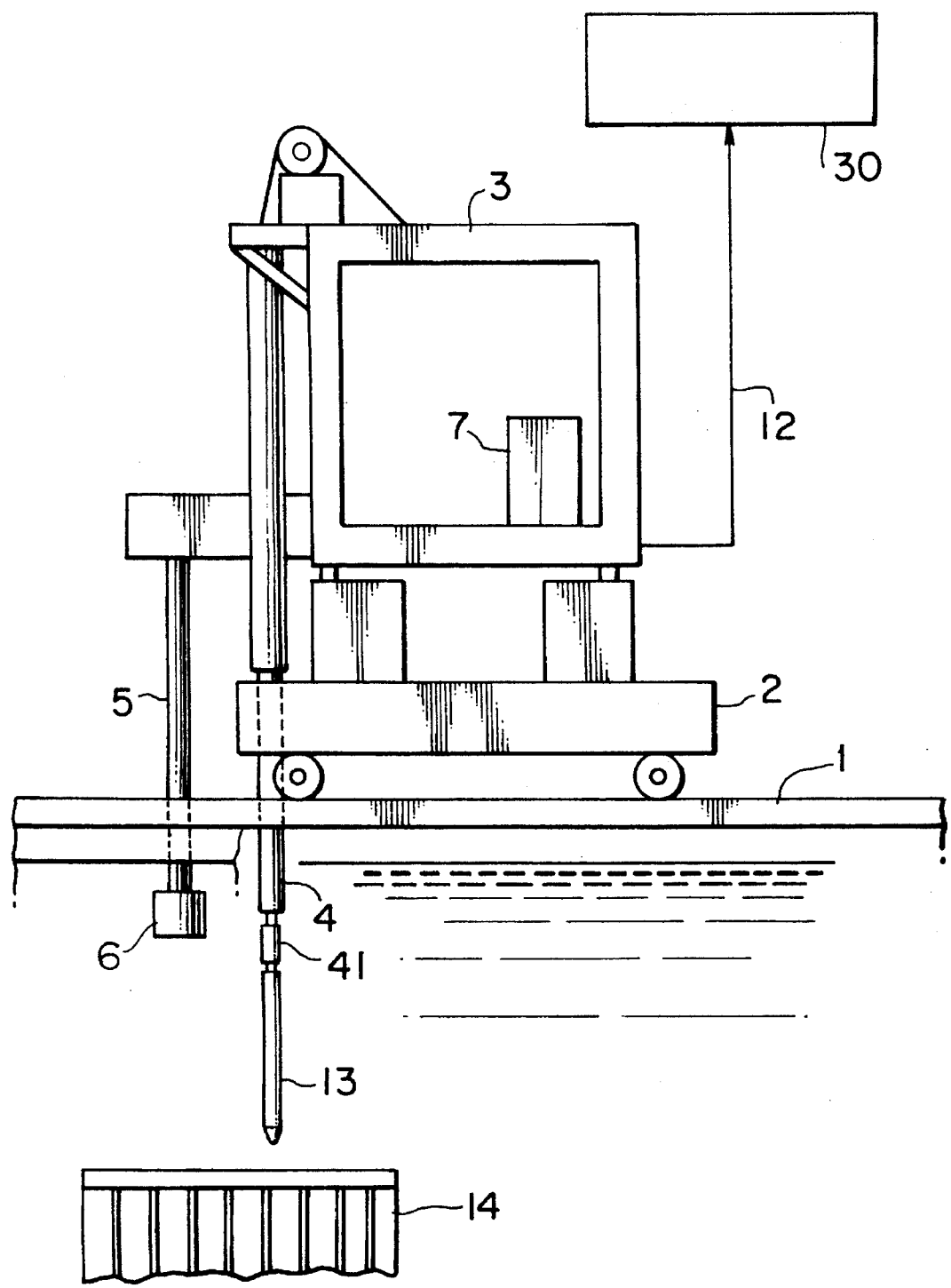
FIG. 2 is a side view of the embodiment shown in FIG. 1.
Figure 3:
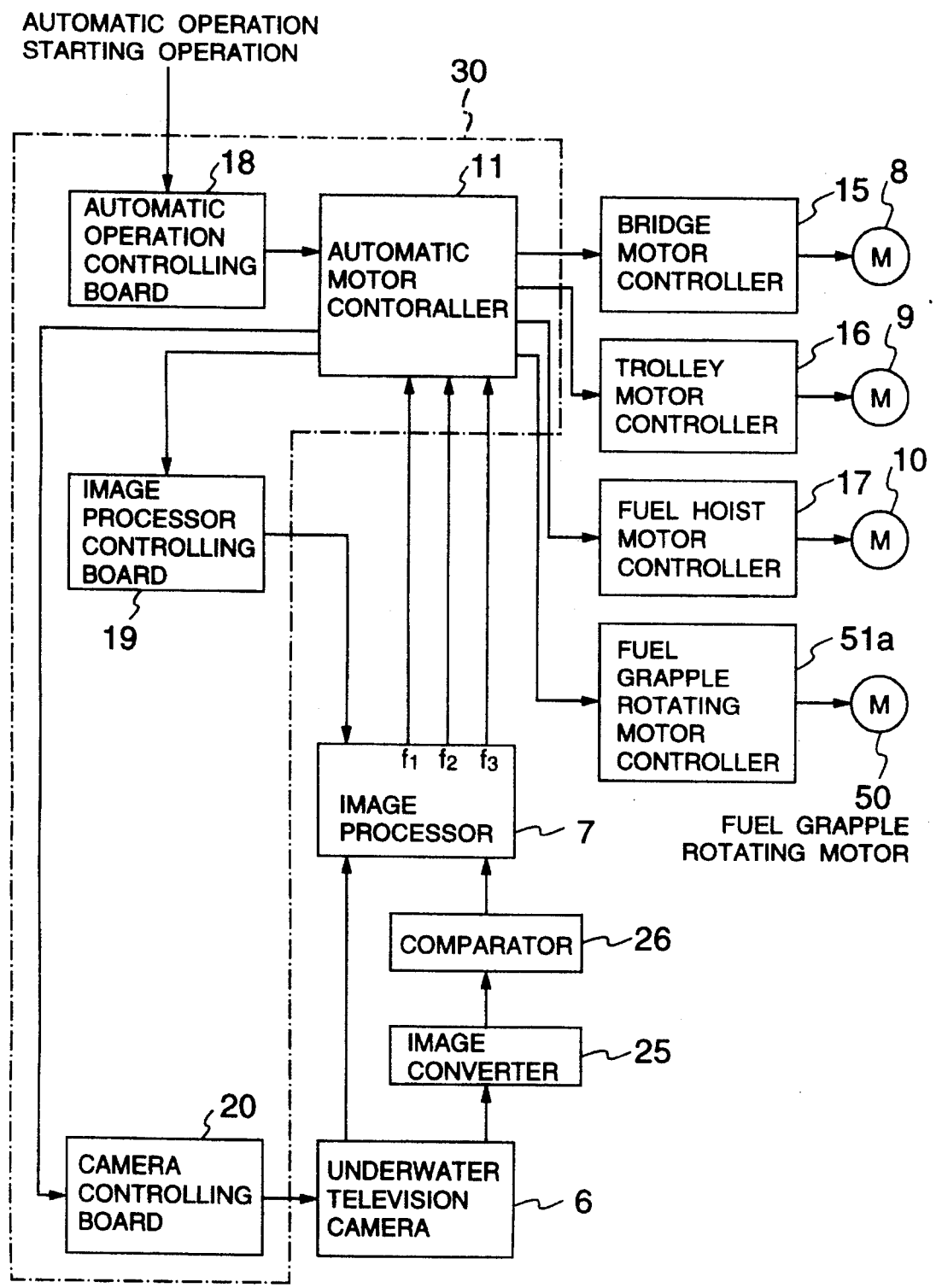
FIG. 3 is a block diagram illustrative of a control system of the embodiment of the present invention.

Referring to FIGS. 1, 2 and 3, an automatic nuclear fuel assembly-replacing apparatus includes rails 1 installed in a building 100. A running carriage or so called bridge 2 is disposed on the rails 1 to move in the longitudinal (axial) direction of the rails 1. Mounted on the bridge 2 is a laterally running carriage or so called trolley 3 which moves on lateral rails 51 mounted on the bridge 2 and extends in the direction perpendicular to the longitudinal direction of the rails 1. The laterally running trolley 3 is provided with a fuel grapple 4 having a gripper 41 driven by compressed air.

The fuel grapple 4 is hoisted and lowered by the operation of a fuel hoist motor 10 provided on the laterally running trolley 3 and controlled by a fuel hoist motor controller 17. Also, a bridge running motor 8 and a trolley running motor 9 are respectively provided on the bridge 2 and the trolley 3 and controlled by a bridge motor controller 15 and a trolley motor controller 16 to move the bridge 2 and the trolley 3. A fourth motor 50 is provided on the laterally running trolley 3 to rotate the fuel grapple 4 about the axis thereof and controlled by a fuel grapple rotating motor controller 51a.

The above-described automatic fuel assembly-replacing apparatus is controlled by a control unit 30 which is placed in a remote control chamber and includes an automatic operation controlling board 18, an image-processor controlling broad 19, a camera controlling board 20, and an automatic motor controller 11. The automatic fuel assembly-replacing apparatus detects the current position (X and Y coordinates) of the fuel grapple 4 by rotating synchronous transmitters (not shown) on the bridge 2 and the trolley 3 by the interaction between racks (not shown) attached to the lateral surfaces of the rails in the X and Y directions and pinions (not shown) attached to the bridge 2 and the trolley 3.

Moreover, the apparatus is provided with an underwater industrial television camera-mounting unit 5, an underwater industrial television (ITV) camera 6 mounted on the lower end portion of the camera-mounting unit 5, and an image processor 7 mounted on the laterally running trolley 3 so as to process images picked up by the ITV camera 6.

The control unit 30 causes the motors 8 and 9 to move the bridge 2 and the laterally running trolley 3, respectively, to a target position and then causes the fuel hoist motor 10 to lower the fuel grapple 4 and, further, causes the motor 50 to rotate the fuel grapple to allow the same to grip or release a fuel assembly. The control unit 30 also controls the movements of fuel assembles, i.e., stores information as to which and from/to where fuel assemblies are moved. The image processor 7 has the functions of: detecting the offset between the center of the camera 6 and that of the target fuel assembly so as to output the detected offset to the automatic motor controller 11 (f1); detecting that an amount of deviation of the forward end of the fuel or the gripper 41 located at the lower end of the fuel grapple 4 is equal to or less than a predetermined value so as to send the automatic motor controller 11 a signal indicating that the fuel grapple 4 is permitted to be lowered (f2); and automatically reading the ID No. inscribed on the handle of the target fuel assembly and verifying the read ID No. against the data which has been stored and, when the ID No. and the data coincide with each other, sending the automatic motor controller 11 a signal indicating that the fuel grapple 4 is allowed to be lowered (f3).

A signal from the ITV camera 6 mounted on the camera-mounting unit 5 is transmitted to an image converter 25 through a control cable 12 and is compared in a comparator 26.

When the apparatus is automatically operated to remove a nuclear fuel assembly 13 (See FIG. 2) from a certain position of a reactor core or to insert the assembly 13 into a desired position, the ITV camera 6 detects deviation of the forward end of the assembly 13 and transmits a detection signal to the image converter 25. Based on the detection signal, the image converter 25 further detects the amount of the deviation of the forward end of the assembly 13 and transmits the detection data to the comparator 26. When the comparator 26 determines that the data is within a reference value, the image processor 7 sends the automatic motor controller 11 an instruction signal to drive the fuel hoist motor 10.

Figure 4:
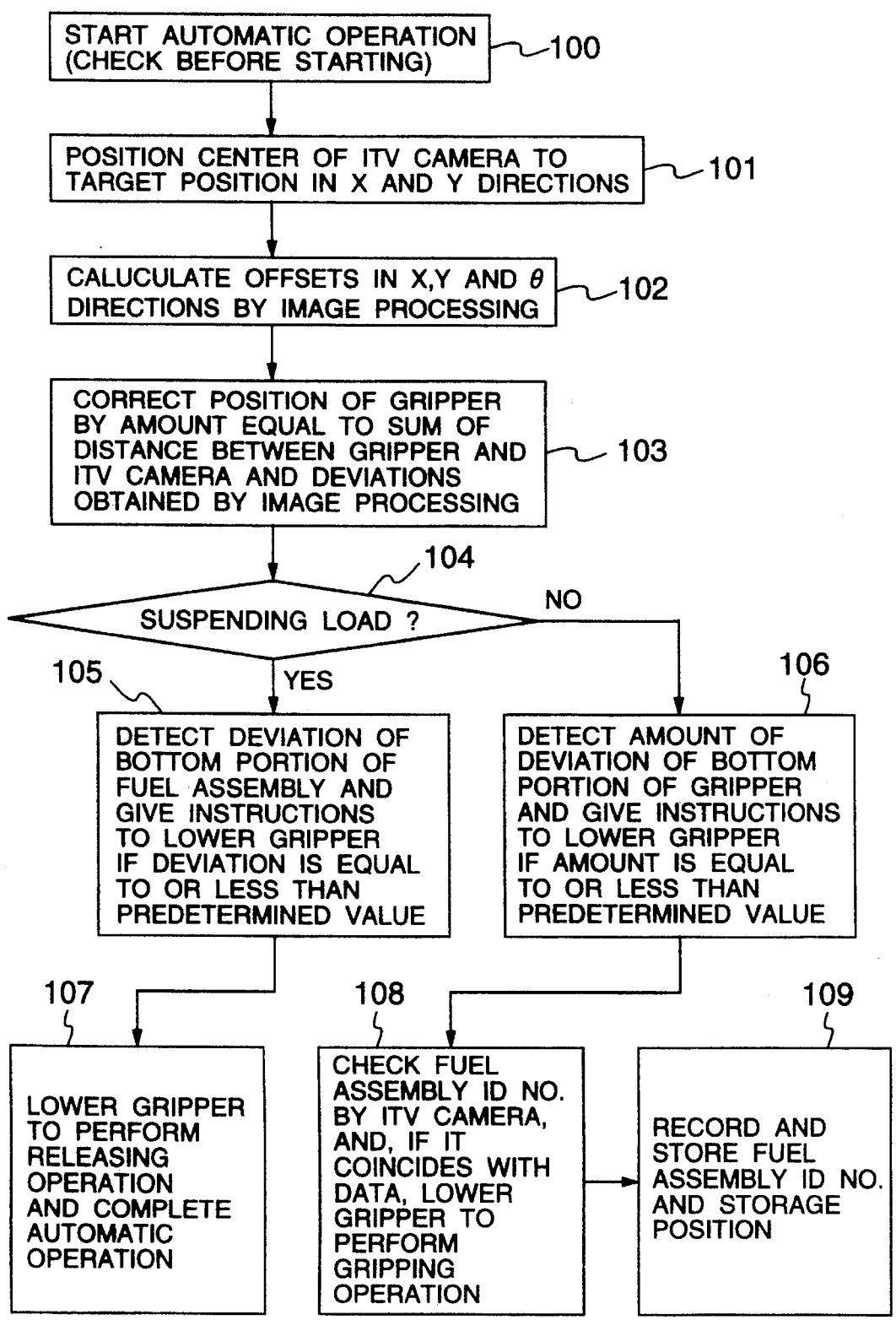
FIG. 4 is a flow chart of the control process performed by the embodiment of the present invention.

A description will now be made of the operation of an embodiment of the apparatus according to the present invention with reference to the block diagram shown in FIG. 3 and the control flow chart shown in FIG. 4. In step 100 of FIG. 4, the automatic operation controlling board 18 within the control unit 30 first transmits an automatic start signal to the automatic motor controller 11 so as to start the automatic control of the apparatus. Before actually starting this controlling operation, a process calculator (not shown) in the automatic motor controller checks the rationality of the controls to be carried out, and if the answer is affirmative, the automatic control is started.

In step 101, the automatic motor controller 11 performs a positioning of the ITV camera 6 in the X and Y directions so that the center of the camera 6 can be located at a target position. In step 102, the image processor 7 calculates offsets (deviations) between the center of the target position and the center of the thus positioned camera 6 in the X, Y and θ directions so as to output them to the automatic motor controller 11.

In step 103, the process calculator within the automatic motor controller 11 corrects the position of the center of the gripper 41 by an amount equal to the sum of the above-described offsets and the distance between the center of the gripper 41 and that of the ITV camera 6 (indicated by d shown in FIG. 5), thereby positioning the center of the gripper 41 to the target position.

Then, in step 104, the presence of a suspending load acting on the fuel grapple 4 is determined. If the answer in step 104 is YES, in step 105, the amount of deviation of the bottom portion of the gripper 41 is detected by the ITV camera 6. If the detected amount of deviation is equal to or less than a predetermined value, the image processor 7 gives the automatic motor controller 11 an instruction signal to lower the gripper 41. Subsequently, in step 107, the gripper 41 is lowered and seated to perform a releasing operation. The automatic operation has thus been completed.

On the other hand, if the absence of a suspending load acting on the grip unit 4 is determined in step 104, in step 106, the amount of deviation of the bottom portion of the gripper 41 is detected by the ITV camera 6. If it is determined that the detected amount of deviation is equal to or less than a predetermined value, the image processor 7 gives the automatic motor controller 11 an instruction signal to lower the gripper 41. Then, in step 108, the ITV camera 6 reads the ID No. inscribed on the handle of the target fuel assembly 13, and the image processor 7 executes image processing on the read information. If such information coincides with the stored data, the image processor 7 gives a permission to lower the gripper 41. Further, in step 109, the fuel ID No. and the fuel assembly storage position are recorded and stored to the process calculator (not shown) within the automatic motor controller 11.

The automatic centering image processing will now be described. The deviations (dXmm, dYmm, dθ°) between the current position (mm) of the ITV camera 6 and the target position (mm) are input into the automatic motor controller 11 by the image processor 7. Then, the final positioning is performed for the deviations (dxmm, dYmm, dθ°) in the X, Y and θ directions.

More specifically, the image positioning is performed according to the following procedure:

(1) A subsequent target position is supplied by a host calculator (not shown).

(2) The automatic motor controller 11 performs a calculation of "target position—current position—ITV camera mounting position deviations". Then, after the controller 11 moves the camera 6 to the position of a target fuel assembly in the X and Y directions and holds the camera 6 at this position, it gives an instruction signal through the image processor controlling board 19 to the image processor 7 to perform position correcting operation in the X, Y and θ directions thus allowing the device 7 to execute the position detecting operation.

(3) The image processor 7 checks that the automatic nuclear fuel assembly-replacing apparatus has been stopped and then reads the dictionary corresponding to the fuel assembly to detect the fuel assembly position from the input image. The image processor 7 then converts by calculation the detected position to the actual distance of the deviation between the center of the ITV camera 6 and that of the target position of the fuel assembly and returns the results.

(4) The automatic fuel assembly-replacing apparatus makes a calculation of the deviations (dXmm, dYmm, dθ°) input by the image processor 7 plus the ITV camera position deviations (constant Xmm and Ymm), thereby performing the final positioning of the gripper 41 in the X, Y and θ directions.

Figure 5:
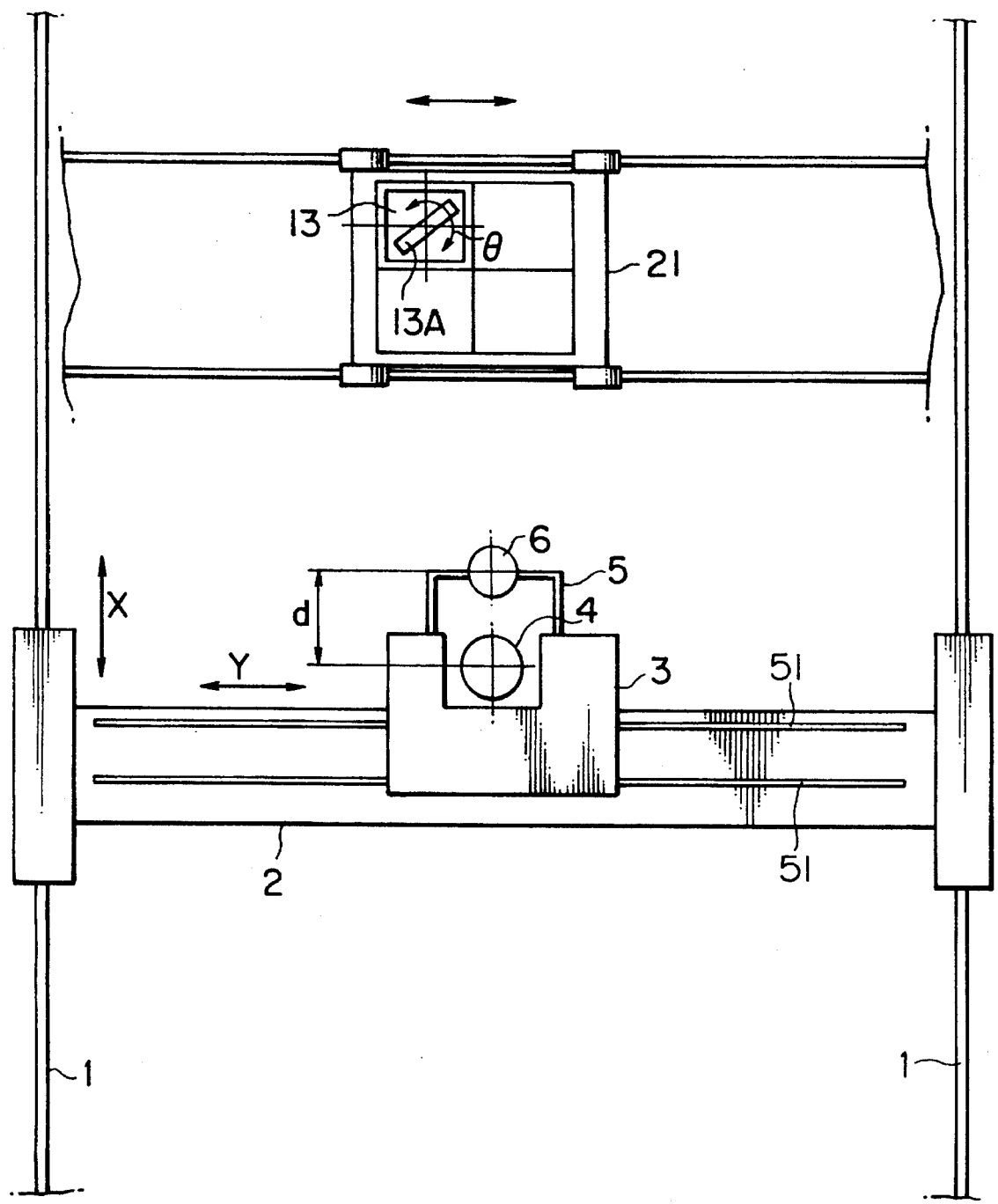
FIG. 5 illustrates a system for controlling the positioning of a fuel grapple relative to a nuclear fuel assembly placed on an underwater carriage.
Figure 6A:
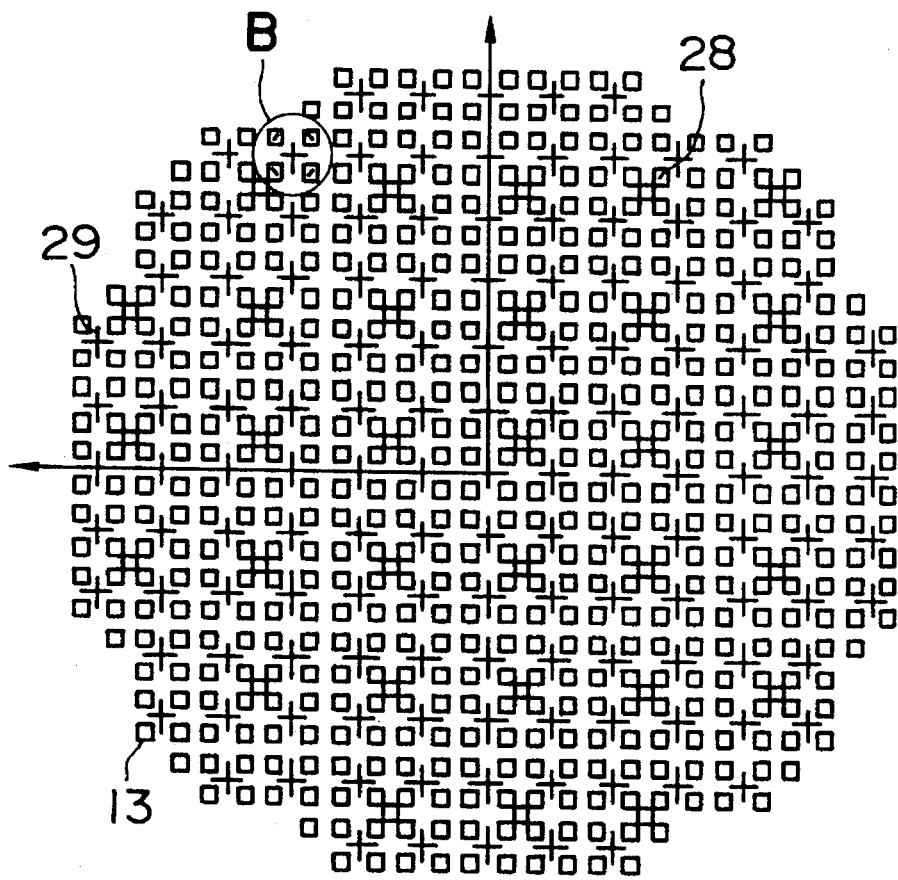
FIG. 6A is a cross sectional view illustrative of the core of a boiling water reactor.
Figure 6B:
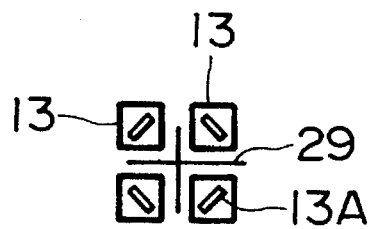
FIG. 6B is an enlarged view illustrative of the positional relationship between one control rod and surrounding four fuel assemblies.
Figure 7:
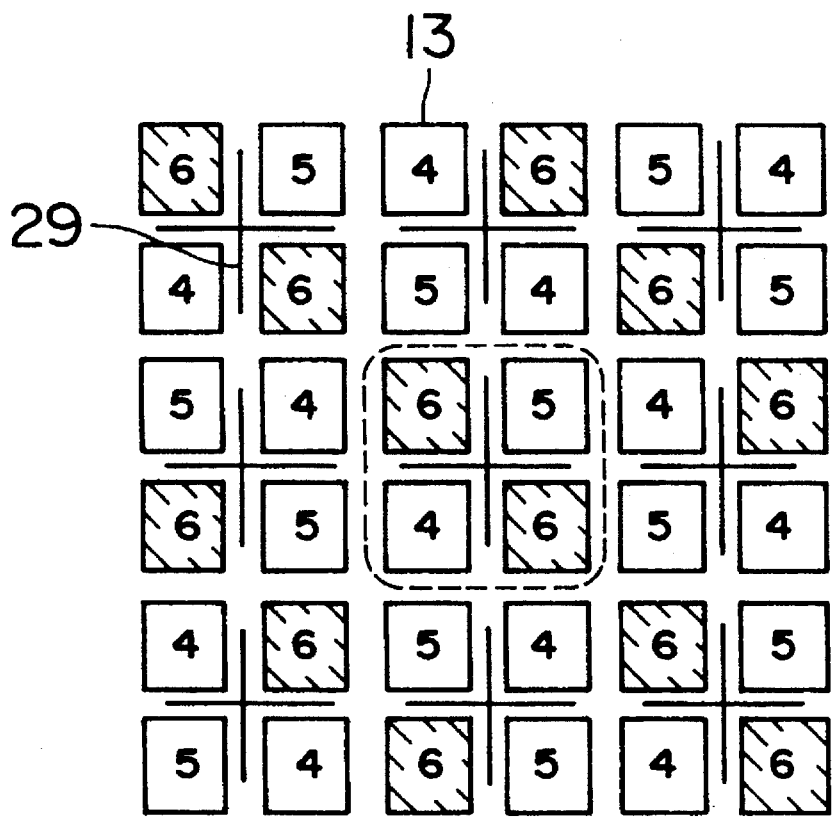
FIG. 7 illustrates the pattern of fuel assemblies loaded in the reactor core.
Figure 8:
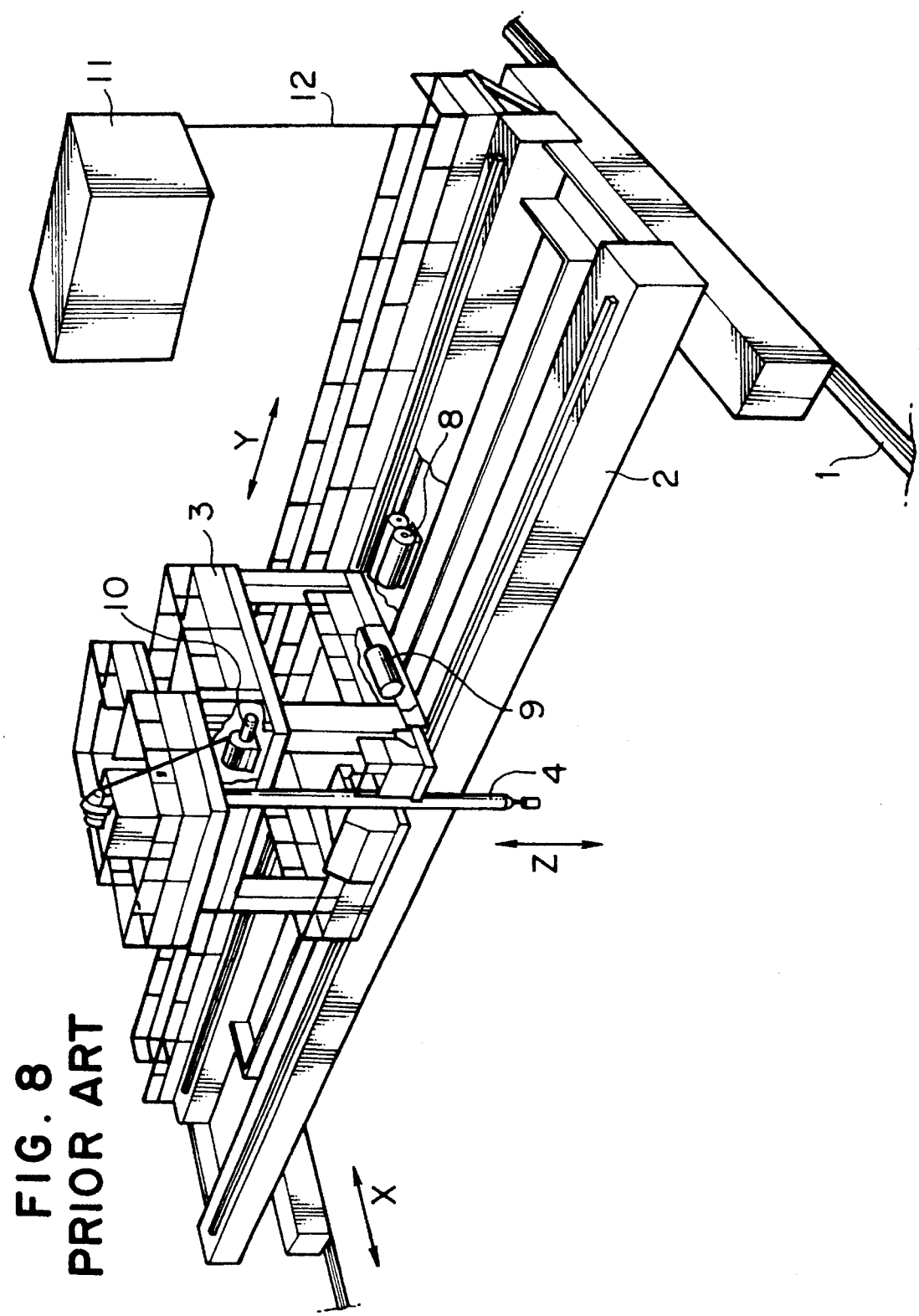
FIG. 8 is a perspective view illustrative of the structure of a conventional automatic nuclear fuel assembly-replacing apparatus.

An explanation will now be made of a control process of storing a nuclear fuel assembly 13, which has been carried by an underwater carriage 21, into a fuel rack within a storage pool of fuel storage facilities by use of the automatic nuclear fuel-replacing apparatus of the present invention, as shown in FIG. 5.

Upon receipt by the operator of a signal indicating that the carriage 21 has reached a predetermined position, an operating signal is given by the operator to the automatic motor controller 11 through the automatic operation controlling board 18 so that the apparatus executes an automatic operation to pick up a nuclear fuel assembly 13 placed on the carriage 21.

For performing a control to position the center of the ITV camera 6 to the stored coordinate of the nuclear fuel assembly 13 placed on the carriage 21, the atomic motor controller 11 gives instructions to the bridge motor controller 15 and the trolley motor controller 16 so that the deviation between the current position of the ITV camera 6 and the target position will become zero.

Upon completion of the centering of the ITV camera 6 to the target position, the image of the nuclear fuel assembly 13 is taken into the image processor 7 by the camera controlling board 20 and compared with a template pattern so that the deviation between the center of the ITV camera 6 and that of the nuclear fuel assembly 13 is accurately calculated and the thus calculated data is transmitted to the automatic motor controller 11. The automatic motor controller 11 thus gives instructions to the bridge motor controller 15, the trolley motor controller 16 and the fuel grapple rotating motor controller 51a so that the bridge motor controller 15, the trolley motor controller 16 and the fuel grapple motor controller 51a actuate the bridge motor 8, the trolley motor 9 and the fuel grapple rotating motor 50, respectively, to assure that the fuel grapple 4 is moved by an amount equal to the sum of the received data, the distance between the center of the ITV camera 6 and that of the fuel grapple 4 and the deviation in respect of the rotation angle θ of the camera 6. Accordingly, the positioning of the fuel grapple 4 to the center of the nuclear fuel assembly 13 can be accurately controlled.

Subsequently, the automatic motor controller 11 instructs the fuel hoist motor controller 17 so that the fuel hoist motor 10 lowers the fuel grapple 41 toward the handle of the fuel assembly 13 and temporarily pauses it at a point just above the handle. During this pause, the image processor 7 detects an amount of deviation of the gripper 41. The detected amount of deviation is compared with a stored reference value. Upon this comparison, if the detected amount is equal to or less than the reference value, the image processor 7 sends the automatic motor controller 11 a signal indicating that the gripper 41 can be lowered. Then, the image processor 7 compares the ID No. inscribed on the handle of the fuel assembly 13 a stored ID No. If the two ID numbers coincide with each other, the image processor 7 sends the automatic motor controller 11 a signal indicating that the gripper 41 can be lowered. The image processor 7 also stores the correspondence between the ID No. and the rack address to which the fuel assembly 13 is going to be moved and stored. Further, if the two signals transmitted to the automatic motor controller 11 satisfy the AND condition, the automatic motor controller 11 instructs the fuel hoist motor controller 17 so that the fuel hoist motor 10 is operated to permit the gripper 41 to be lowered and seated on the handle of the fuel assembly 13 and then grips the handle. According to the above-described process, the fuel assembly 13 can be automatically transferred to the fuel storage rack from the underwater carriage 21.

As will be clearly understood from the foregoing description, the present invention offers the following advantages:

It is possible to automatically position the fuel grapple to a nuclear fuel assembly which has the possibility of moving within a certain range and also to transfer the fuel assembly, whereby the speed of the fuel transferring operation is increased to effectively save the labor of the operator and decrease radiation exposure.

Moreover, the image processing makes it possible to detect the positional deviation occurring when a fuel assembly is inserted into a rack or a reactor core, thereby avoiding the occurrence of sticking of the fuel assembly or of other disadvantages, which prevents occurrence of damage to the fuel assembly and also shortens the time required for the replacement of fuel assemblies.

Further, the ID No. of the fuel assembly is automatically read and is compared with the stored data by the image processor. After it is confirmed that the ID number and the stored data coincide with each other, the fuel assembly is permitted to be transferred. With this system, therefore, human errors can be prevented, thereby improving the reliability of the transferring of the fuel assembly. Additionally, the detected ID No. and the rack address to which the fuel assembly of the ID No. is moved can be recorded and stored in a co-related manner, such stored data can be used as data for material accountancy of fuel assemblies, thus eliminating the necessity of independently or additionally performing a material accounting step by means of a camera and a video.

What is claimed is:

1. An automatic nuclear fuel assembly-replacing apparatus for transferring a nuclear fuel assembly in a facility, said apparatus comprising:

rails fixed to said facility and extending in an X axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said Z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said x and Y axes and about said Z axis, respectively, said controller further including means for controlling said first, second and fourth drive means upon receipt of said signal indicative of the calculated deviations in the directions of said X and Y axes and about said Z axis, respectively, so as to move said fuel grapple by an amount equal to said deviations adjusted by an offset between said television camera and said fuel grapple, thereby bringing the position of said fuel grapple into alignment with that of said target fuel assembly.

2. An automatic nuclear fuel assembly-replacing apparatus for transferring a nuclear fuel assembly in a facility, said apparatus comprising:

rails fixed to said facility and extending in an X axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said Z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said X and Y axes and about said Z axis, respectively, said controller further including means for controlling said first, second and fourth drive means upon receipt of said signal indicative of the calculated deviations in the directions of said X and Y axes and about said z axis, respectively, so as to move said fuel grapple by an amount equal to said deviations adjusted by an offset between said television camera and said fuel grapple, thereby bringing the position of said fuel grapple into alignment with that of said target fuel assembly, said image processor further including:

determining means for determining whether a gripper of said fuel grapple grips a nuclear fuel assembly or not; and detection means for detecting that, when it is determined that said gripper grips the fuel assembly, an amount of deviation of the bottom portion of the fuel assembly is equal to or less than a predetermined value, said controller further including means for controlling said third drive means, upon receipt of a signal from said detection means of said image processor, to lower said gripper and to allow said gripper to release said fuel assembly.

3. An automatic nuclear fuel assembly-replacing apparatus for transferring a nuclear fuel assembly in a facility, said apparatus comprising:

rails fixed to said facility and extending in an X axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said Z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said X and Y axes and about said Z axis, respectively, said controller further including means for controlling said first, second and fourth drive means upon receipt of said signal indicative of the calculated deviations in the directions of said X and Y axes and about said Z axis, respectively, so as to move said fuel grapple by an amount equal to said deviations adjusted by an offset between said television camera and said fuel grapple, thereby bringing the position of said fuel grapple into alignment with that of said target fuel assembly, said image processor further including:

determining means for determining whether a gripper of said fuel grapple grips a nuclear fuel assembly or not;

detection means for detecting that, when it is determined that said gripper does not grip any fuel assembly, an amount of deviation of the bottom portion of said gripper is equal to or less than a predetermined value so as to allow said controller to control said third drive means so that said fuel grapple is lowered;

means for reading an ID number marked on the targeted fuel assembly and determining that the read ID number corresponds to a desired one, thereby permitting said corresponds to a desired one, thereby permitting said controller to control said third drive so that said fuel grapple is lowered, and also allowing said gripper to perform a gripping operation; and means for recording and storing a relationship between the thus read ID number of the fuel assembly and the position at which the assembly is stored.

4. An automatic nuclear fuel assembly-replacing apparatus for transferring a nuclear fuel assembly in a facility, said apparatus comprising:

rails fixed to said facility and extending in an X axis direction;

a bridge movable on said rails;

lateral rails fixed to said bridge and extending in a Y axis direction;

a laterally movable trolley movable on said lateral rails;

a fuel grapple suspending from said trolley and having a gripper and being movable upwardly and downwardly in a Z axis direction rotatable about said Z axis;

an underwater television camera-mounting means provided on said trolley and spaced from said fuel grapple a distance in the horizontal direction;

an underwater television camera mounted on said camera-mounting means;

a first drive means for moving said bridge in said X axis direction;

a second drive means for moving said trolley in said Y axis direction;

a third drive means for hoisting and lowering said fuel grapple in said Z axis direction;

a fourth drive means for rotating said fuel grapple about said Z axis;

an image processor for processing an image output from said television camera; and a controller for receiving a signal output from said television camera to automatically control said first, second, third and fourth drive means, said controller having means for driving said first and second drive means, upon receipt of said signal from said image processing device, to position said television camera so that the center of said television camera is positioned to a desired and target position, said image processing device including means for calculating deviations between the position of the thus positioned television camera and that of a target fuel assembly in the directions of said X and Y axes and about said Z axis, respectively, said controller further including means for controlling said first, second and fourth drive means upon receipt of said signal indicative of the calculated deviations in the directions of said X and Y axes and about said Z axis, respectively, so as to move said fuel grapple by an amount equal to said deviations adjusted by an offset between said television camera and said fuel grapple, thereby bringing the position of said fuel grapple into alignment with that of said target fuel assembly, said image processor further including:

determining means for determining whether a gripper of said fuel grapple grips a nuclear fuel assembly; and detection means for detecting that, when it is determined that said gripper grips said fuel assembly an amount of deviation of the bottom portion of the fuel assembly is equal to or less than a predetermined value, said controller further including means for controlling said third drive means, upon receipt of a signal from said detection means of said image processor, to lower said gripper and cause said gripper to release said fuel assembly, said image processor further including:

detection means for detecting that, when it is determined that said gripper does not grip any fuel assembly, an amount of deviation of the bottom portion of said gripper is equal to or less than a predetermined value so as to allow said controller to control said third drive means so that said fuel grapple is lowered;

means for reading an ID number marked on the target fuel assembly and determining that the read ID number corresponds to a desired one, thereby permitting said controller to control said third drive means so that said fuel grapple is lowered, and also allowing said gripper to perform a gripping operation; and means for recording and storing a relationship between the thus read ID number of the fuel assembly and the position at which the assembly is stored.

* * * * *